Dec. 29, 1942.    W. J. MORRILL    2,306,743
SUPPORTING STRUCTURE FOR A MACHINE
Filed May 15, 1941

Inventor:
Wayne J. Morrill,
by Harry E. Dunham
His Attorney.

Patented Dec. 29, 1942

2,306,743

UNITED STATES PATENT OFFICE 2,306,743

SUPPORTING STRUCTURE FOR MACHINES

Wayne J. Morrill, Fort Wayne, Ind., assignor to General Electric Company, a corporation of New York Application May 15, 1941, Serial No. 393,542

7 Claims. (Cl. 308—132)

My invention relates to an improved supporting and bearing construction for machines.

An object of my invention is to provide an improved unit bearing for supporting the rotatable member of the machine.

Another object of my invention is to provide an improved bearing and lubricating arrangement for a machine having a unit supporting bearing.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
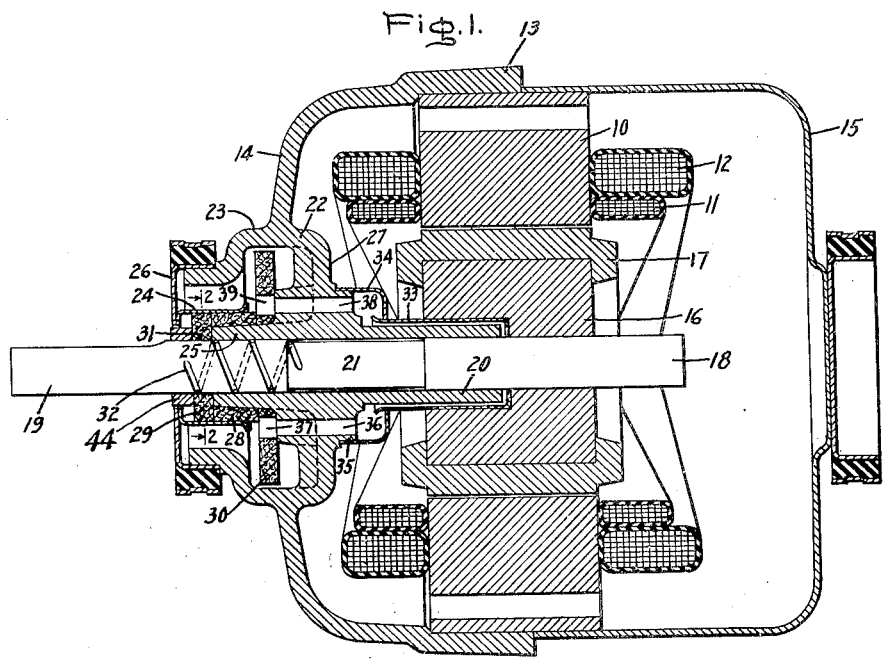
Figure 2:
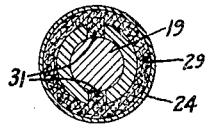
Figure 3:
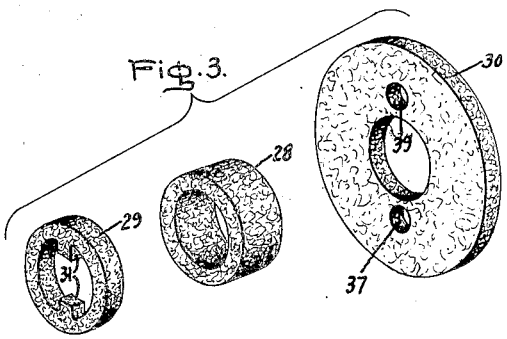
Figure 4:
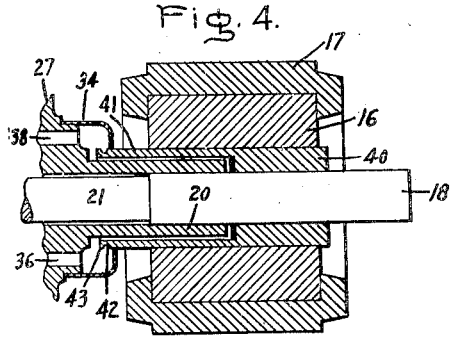

Fig. 1 is a sectional side elevational view of a unit bearing motor including an embodiment of my invention; Fig. 2 is a sectional view taken along line 2—2 of Fig. 1; Fig. 3 is an exploded perspective view of the three elements of absorbent material adapted to supply lubricant to the bearing from the lubricant reservoir; and Fig. 4 is a partial sectional view showing a modification of the rotor shown in Fig. 1.

Referring to the drawing, I have shown a dynamo-electric machine having a stationary member provided with a core 10 of magnetic material and starting and running exciting windings 11 and 12, respectively. The core 10 is mounted in a stationary frame 13 which extends as an end shield 14 about one end of the machine and a sheet metal cup-shaped end shield 15 is pressed over the other end of the stationary member core 10 to provide an enclosure thereabout. The machine is provided with a rotatable member having a core 16 of magnetic material in which a squirrel cage winding 17 is arranged, so that the rotatable member will react electrodynamically with the stationary member of the machine. This rotatable member is mounted on an extending end 18 of a shaft 19 which is supported by a unit bearing member 20 formed as an integral part of the stationary member end shield 14. The shaft 19 extends beyond the bearing 20 at the end opposite the rotatable member 16 to provide a driving connection with a driven member, and an intermediate portion 21 of the shaft 19 is relieved and made of a smaller diameter than the two end portions of the shaft, such that the shaft is provided with two bearing engaging portions which engage the bearing 20 adjacent each end thereof. This construction provides a more rigid support for the rotatable member of the machine and also reduces the bearing friction losses.

In order to provide adequate lubrication to the bearing surfaces of the shaft 19, a lubricant reservoir is formed in the end shield 14 and includes a pair of oppositely extending outer walls 22 and 23 and a pair of oppositely extending inner walls, one of which is formed by a pressed sheet metal cup-shaped element 24 and the other of which is formed by the outer end 25 of the bearing 20. These inner and outer walls are provided with end walls 26 and 27 on the outer ends thereof, respectively, forming oppositely extending cup-shaped portions having their respective open ends adjacent each other intermediate the ends of the reservoir. The inner walls 24 and 25 are formed of different diameters and have their adjacent inner ends arranged in telescoping relationship with a space arranged therebetween. An intermediate member or part 28 of absorbent material extends axially in the space between partially coextensive portions of inner walls 24 as shown in Fig. 1, 25 and extends slightly beyond the inner ends of these walls into engagement with annular elements 29 and 30, also of absorbent material. The annular element 29 is provided with radially extending portions 31 which extend into contact with the shaft 19, and the outer periphery of this element is enclosed by the inner wall 24. The annular element 30 extends into the lubricant reservoir substantially at the middle portion thereof and is adapted to extend into lubricant in the reservoir when the motor is arranged horizontally, as shown in Fig. 1, so that lubricant will pass by capillary action from the reservoir to the absorbent material element 30, through the absorbent material element 28, to the annular absorbent material element 29, and through the projections 31 to the shaft 19. A spiral groove 32 is formed in the end of the shaft 19 and extends from the part thereof which contacts the projections 31 to the part 21 thereof which is of reduced diameter. This groove is adapted to conduct oil along the bearing, which engages the portion of the shaft in which the groove is formed, and to pump this oil into the space between the intermediate shaft portion 21 and the bearing 20 from which the oil is fed to the other end of the shaft which engages the bearing 20. Excess lubricant passes from the end of the bearing 20 adjacent the rotatable member 16 and into a sheet metal cup-shaped element 33 which is pressed into an opening in the rotatable member. The outer end of the cup-shaped member 33 flares outwardly, so that lubricant will be thrown outwardly by centrifugal force when the rotatable member 16 rotates, and this lubricant will be collected in a stationary sheet metal cup-shaped member 34 which is pressed on an annular flange 35 formed on the outer walls 27 of the lubricant reservoir. An axially extending opening 36 is formed through the wall 27 of the lubricant reservoir and extends from the compartment formed by the cup-shaped member 34 to the lubricant reservoir and communicates with an opening 37 formed in the annular member 30 of absorbent material, so that excess lubricant which is collected in the chamber formed by the member 34 will be returned to the lubricant reservoir through the passages 36 and 37. Breather openings 38 and 39 are formed in the upper end of the lubricant reservoir wall 27 and the absorbent material element 30, respectively, and are arranged in communication with each other to provide for the free passage of air from the lubricant reservoir to the interior of the motor, so as to equalize the pressures in these respective parts of the motor.

During shipping and handling, the motor may be tilted from its normally horizontal position shown in Fig. 1, and if the rotatable member 16 is placed in a position substantially vertically above the bearing member 20, the inner end of the opening in the core 16 into which the cup-shaped member 33 is pressed will contact the inner end of the bearing 20 and prevent further movement of the rotatable member. In order to prevent the rotatable member and the shaft from falling out of the bearing 20 when the machine is tilted in a direction such that the bearing 20 is above the rotatable member 16, a collar 44 is secured to the shaft 19 adjacent the annular absorbent material element 29 and is arranged adjacent the ends of sections 25 of the shaft supporting structure, and thereby prevents axial movement of the rotatable member away from the bearing 20.

With this construction, lubricant is prevented from escaping from the lubricant reservoir when the machine is tilted such that one portion of the lubricant reservoir is substantially vertically above another portion thereof, as the absorbent material element 30 is adapted to be out of contact with the lubricant when the motor is tilted in either of such positions. If the motor is tilted such that the rotatable member 16 is above the bearing 20, lubricant will pass into the reservoir portion between the outer wall 23 and the inner wall 24 and will be out of contact with any of the absorbent material, whereas if the machine is tilted in the other direction such that the bearing 20 is above the rotatable member 16, the lubricant in the reservoir will pass into the enlarged reservoir portion shown in dotted lines in Fig. 1 between the outer wall 22, the inner wall bearing portion 25, and the end wall 27 and again be maintained out of contact with the absorbent material. Thus, my improved motor and bearing construction will provide for adequate lubrication of the motor bearing under normal operating conditions and will prevent the escape of lubricant from the motor during shipping and handling thereof.

In Fig. 4 I have shown a modification of the construction of the rotatable member of the motor shown in Fig. 1 and the same elements are indicated by the same reference characters as in Fig. 1. In this construction, the core 16 is mounted on a sleeve 40, which is formed with an axially projecting hollow portion 41 arranged in radially spaced relationship about the adjacent end of the unit bearing 20 and extends into the cup-shaped lubricant collector 34. An annular groove 42 is formed adjacent the end of the portion 41 of the sleeve 40 to provide a thin edge 43 for slinging off into the collector 34 any excess lubricant which may pass from the bearing 20 into the space between the bearing and the sleeve portion 41. As in the other construction illustrated, this excess lubricant is adapted to drain back to the lubricant reservoir through an opening 36 in the reservoir wall 27.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. A supporting structure for a machine having a stationary member and a rotatable member, said stationary member including a frame having a bearing, means including a shaft having a section in engagement with said bearing for supporting said rotatable member thereon, a lubricant reservoir including said bearing and having inner and outer walls extending longitudinally about said shaft with end walls on the outer ends of said inner and outer walls forming oppositely extending cup-shaped portions having their respective open ends adjacent each other intermediate the ends of said reservoir, means including absorbent material extending into contact with said shaft and into said lubricant reservoir and a part thereof extending axially between axially coextensive portions of said inner walls for supplying lubricant from said reservoir to said bearing, and means for substantially preventing escape of lubricant from said reservoir when said machine is arranged with either of said reservoir portions substantially vertically above the other.

2. A supporting structure for a machine having a stationary member and a rotatable member, said stationary member including a frame having a bearing, means including a shaft having a section in engagement with said bearing for supporting said rotatable member on a projecting end thereof, said shaft extending from said bearing at the end thereof opposite said rotatable member, a lubricant reservoir including said bearing and having inner and outer walls extending longitudinally about said shaft with end walls on the outer ends of said inner and outer walls forming oppositely extending cup-shaped portions having their respective open ends adjacent each other intermediate the ends of said reservoir, means including absorbing material extending into contact with said shaft and into said lubricant reservoir adjacent the central part thereof for supplying lubricant from said reservoir to said bearing, a portion of said absorbent material extending axially between axially coextensive portions of said inner walls said cup-shaped reservoir portions being of such size and having said walls arranged to contain lubricant in said reservoir substantially out of contact with said absorbent material and substantially to prevent escape of lubricant from said reservoir when said machine is arranged with either of said reservoir portions substantially vertically above the other.

3. A supporting structure for a machine having a stationary member and a rotatable member, said stationary member including a frame having a bearing, means including a shaft having a section in engagement with said bearing for supporting said rotatable member thereon, means including a spiral groove in said shaft extending along said bearing supporting section for conducting lubricant thereto, a lubricant reservoir including said bearing and having inner and outer walls extending longitudinally about said shaft with end walls on the outer ends of said inner and outer walls forming oppositely extending cup-shaped portions having their respective open ends adjacent each other intermediate the ends of said reservoir, means including absorbent material extending into contact with said shaft and into said lubricant reservoir for supplying lubricant from said reservoir to said bearing, said absorbent material having an axially extending part partially enclosed between axially coextensive portions of said reservoir inner walls to prevent passage of lubricant thereto except through said absorbent material extending into said reservoir, and means for returning excess lubricant from said bearing to said reservoir.

4. A supporting structure for a machine having a stationary member and a rotatable member, said stationary member including a frame having a bearing, means including a shaft having a section in engagement with said bearing for supporting said rotatable member on a projecting end thereof, said shaft extending from said bearing at the end thereof opposite said rotatable member, a lubricant reservoir including said bearing and having inner and outer walls extending longitudinally about said shaft with end walls on the outer ends of said inner and outer walls forming oppositely extending cup-shaped portions having their respective open ends adjacent each other intermediate the ends of said reservoir, said outer walls being connected together to form a closed outer surface and said inner walls being of different diameters and having their adjacent inner ends arranged in telescoping relationship with a space therebetween, means including absorbent material in said space between said inner walls extending into contact with said shaft and into said lubricant reservoir adjacent the central part thereof for supplying lubricant from said reservoir to said bearing, and means for retaining said shaft in said bearing.

5. A supporting structure for machine having a stationary member and a rotatable member, said stationary member including a frame having a unit bearing, means including a shaft having sections in engagement with said bearing for supporting said rotatable member on a projecting end thereof, said shaft extending from said bearing at the end thereof opposite said rotatable member and having a section of relatively smaller diameter intermediate said bearing engaging sections forming an inner and an outer bearing support, a lubricant reservoir including said bearing and having inner and outer walls extending longitudinally about said shaft with end walls on the outer ends of said inner and outer walls forming oppositely extending cup-shaped portions having their respective open ends adjacent each other intermediate the ends of said reservoir, said outer walls being connected together to form a closed outer surface and said inner walls being of different diameters and having their adjacent inner ends arranged in telescoping relationship with a space therebetween, means including absorbent material in said space between said inner walls extending into contact with said shaft and into said lubricant reservoir for supplying lubricant from said reservoir to said bearing.

6. A supporting structure for a machine having a stationary member and a rotatable member, said stationary member including a frame having a bearing, means including a shaft having a section in engagement with said bearing for supporting said rotatable member on a projecting end thereof, said shaft extending from said bearing at the end thereof opposite said rotatable member, means including a spiral groove in said shaft extending along said bearing supporting section for conducting lubricant thereto, a lubricant reservoir including said bearing and having inner and outer walls extending longitudinally about said shaft with end walls on the outer ends of said inner and outer walls forming oppositely extending cup-shaped portions having their respective open ends adjacent each other intermediate the ends of said reservoir, means including absorbent material extending into contact with said shaft and into said lubricant reservoir adjacent the central part thereof for supplying lubricant from said reservoir to said bearing, said cup-shaped reservoir portions being of such size and having said walls arranged to contain lubricant therein substantially out of contact with said absorbent material and substantially to prevent escape of lubricant from said reservoir when said machine is arranged with either of said reservoir portions substantially vertically above the other, and said absorbent material having an axially extending part partially enclosed between axially coextensive portions of said reservoir inner walls to prevent passage of lubricant thereto except through said absorbent material extending into said reservoir.

7. A supporting structure for a machine having a stationary member and a rotatable member, said stationary member including a frame having a unit bearing, means including a shaft having sections in engagement with said bearing for supporting said rotatable member on a projecting end thereof, said shaft extending from said bearing at the end thereof opposite said rotatable member and having a section of relatively smaller diameter intermediate said bearing engaging sections forming an inner and an outer bearing support, means including a spiral groove in said shaft extending along said outer bearing supporting section for conducting lubricant along said outer section and to said inner bearing supporting section, a lubricant reservoir including said bearing and having inner and outer walls extending longitudinally about said shaft with end walls on the outer ends of said inner and outer walls forming oppositely extending cup-shaped portions having their respective open ends adjacent each other intermediate the ends of said reservoir, said inner walls being of different diameters and having their adjacent inner ends arranged in telescoping relationship with a space therebetween, intermediate absorbent material in said space between said inner walls and extending slightly beyond the ends thereof at each end, absorbent material extending into contact with said shaft and an end of said intermediate absorbent material and being covered at its outer peripheral surface by one of said inner walls, and other absorbent material extending into contact with the other end of said intermediate absorbent material and into said lubricant reservoir and having its inner peripheral surface covered by the other of said inner walls.

WAYNE J. MORRILL.